(12) United States Patent
Li et al.

(10) Patent No.: US 6,272,264 B1
(45) Date of Patent: Aug. 7, 2001

(54) MULTIPLE-CHANNEL OPTICAL FILTER

(75) Inventors: Wei Zhong Li, San Jose; Feng Liu, Sunnyvale; Wenhui Wang; Wei Luo, both of San Jose, all of CA (US)

(73) Assignee: Oplink Communications, Inc., San Jose, CA (US)

( * ) Notice: Subject to any disclaimer, the term of this patent is extended or adjusted under 35 U.S.C. 154(b) by 0 days.

(21) Appl. No.: 09/348,728

(22) Filed: Jul. 6, 1999

(51) Int. Cl.[7] .................................................. G02B 6/26
(52) U.S. Cl. ................... 385/27; 385/24; 385/34
(58) Field of Search ...................... 385/27, 24, 31–35; 359/308, 341

(56) References Cited

U.S. PATENT DOCUMENTS

| | | | |
|---|---|---|---|
| 4,880,289 | * | 11/1989 | Imoto et al. ............................. 385/27 |
| 5,781,332 | * | 7/1998 | Ogata ................... 359/308 |
| 5,841,573 | * | 11/1998 | Kim ...................... 359/341 |
| 5,889,904 | * | 3/1999 | Pan et al. ............................... 385/24 |

* cited by examiner

Primary Examiner—Rodney Bovernick
Assistant Examiner—Ellen E. Kim
(74) Attorney, Agent, or Firm—Sawyer Law Group LLP

(57) ABSTRACT

A method and system for providing an optical filter is disclosed. The method and system include providing a first fiber for carrying a first optical signal and a second fiber for carrying a second optical signal. The first fiber has an end. The method and system also include providing a filter and a lens disposed between the filter and the end of the first fiber. The filter has a surface and is for filtering the first optical signal to provide the second optical signal. The lens has an axis and is for collimating the first optical signal. A normal to the surface of the filter is disposed at a first nonzero angle to the axis. The first optical signal has a first direction of propagation at the surface of the filter. The first direction of propagation is disposed at a second nonzero angle from the normal to the surface of the filter. The filter can be tuned by rotating the filter around the axis. Furthermore, additional fibers can be added to simultaneously filter multiple channels.

25 Claims, 3 Drawing Sheets

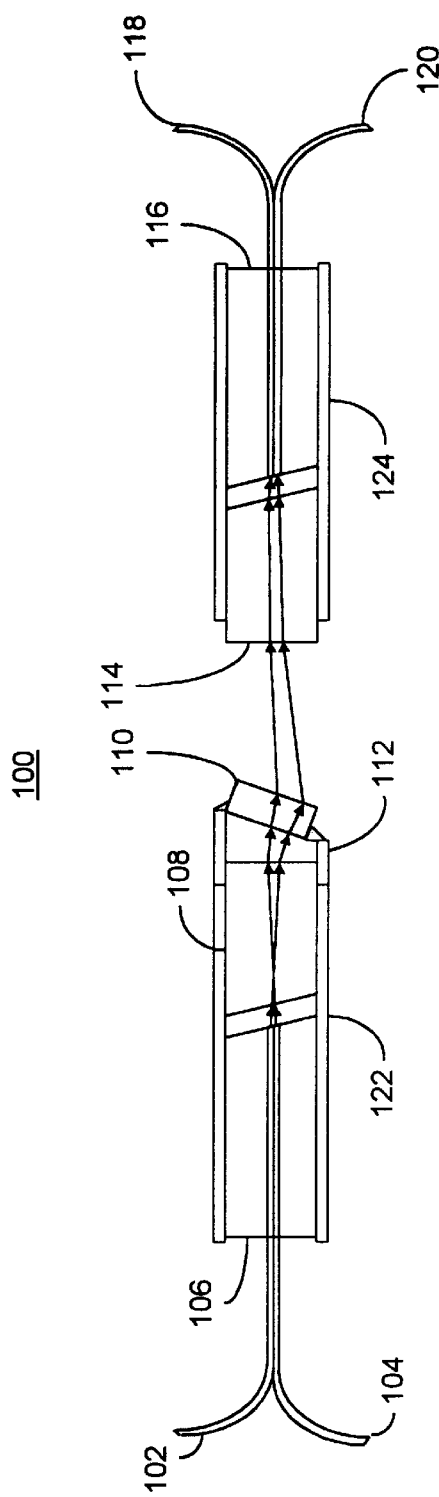
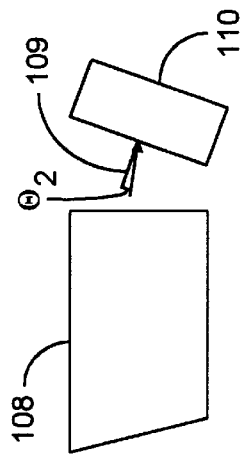
Figure 3A
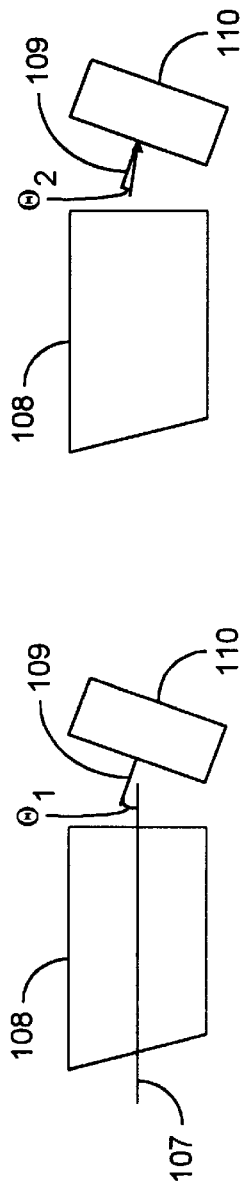
Figure 3B
Figure 2

MULTIPLE-CHANNEL OPTICAL FILTER

FIELD OF THE INVENTION

The present invention relates to optical technology, and more particularly to a two-channel optical filter having improved cost and manufacturability.

BACKGROUND OF THE INVENTION

Optical technology utilizes optical signals in order to carry information. Typically, the signals are carried on different channels. Each channel typically includes a small range of wavelengths centered on a characteristic wavelength. Often an optical signal is a composite signal including multiple channels. Because each channel has its own characteristic wavelengths, multiple channels can be carried at the same time by the same component, such as a fiber. As the use of optical technology increases, the number of signals transmitted on a single fiber also increases. Currently, optical signals can include twenty, forty, or more channels.

Optical technology also utilizes optical filters for a variety of applications. Filters transmit light in a pass band. The pass band of the filter is a range of wavelengths centered on a central wavelength. One application for filters is in demultiplexing an optical signal carrying multiple channels. In order to create the optical signal, channels at a plurality of characteristic wavelengths are multiplexed together. A single cable may then be used for transmission. After the multiplexed, multi-channel signal reaches the destination, the channels are demultiplexed to access the information carried by a single channel. Conventional optical filters can be used to combine individual signals as well as to separate a composite signal into individual channels.

In order to separate a composite signal into its component channels, a plurality of conventional optical filters, one for each channel, are cascaded in series. Each optical filter includes an input, usually a fiber, which is held in place by a holder, such as a glass capillary. The optical filter is transmitted to a lens, which collimates the signal, and a filter. The lens is typically a GRIN (Graduated Index of refraction) lens. The filter passes light centered on a single wavelength. The filtered light is then typically provided to a second lens and output over a second fiber held in place by a second holder. Thus, each optical filter outputs a single channel. As each component wavelength is separated from the composite signal, the remaining portion of the composite signal is passed on to the next optical filter in the series. Thus, the signal is separated into its components. Note that other applications may also use optical filters. In general, optical filters are useful in applications where it is desired to remove a portion of the signal outside of the filter's pass band. Thus, filters may be used in noise removal or other applications.

Although conventional systems for filtering signals are capable of transmitting light in the pass band, a conventional filter is typically fixed to the end of the GRIN lens. The angle of incidence of the signal is the angle between the direction of propagation of the signal and the normal to the surface. Thus, the angle of incidence of the optical signal for the filter is fixed. The signal from the GRIN lens also typically passes parallel to the axis of the GRIN lens. Thus, the angle of incidence of the optical signal at the surface of the filter is typically at approximately zero degrees. The central wavelength for the pass band is, therefore, also fixed. When manufacturing the optical filter, therefore, the filter used must be carefully selected to have the desired central wavelength. As a result, the filter itself will be subject to tighter specifications in order to ensure that the appropriate portion of the signal is transmitted. The tighter specifications make the filter more expensive and difficult to make. In addition, one filter is typically used for each channel. As a result, the cost of providing optical filters for a composite signal is high. This is true because the cost of producing filters with different specifications is higher than the cost of producing filters having the same specifications. In addition, the filters will occupy a relatively large space.

Accordingly, what is needed is a system and method for providing an optical filter which is low cost, relatively easy to manufacture, and relatively accurate. The present invention addresses such a need.

SUMMARY OF THE INVENTION

The present invention provides a method and system for providing an optical filter. The method and system comprise providing a first fiber, a second fiber, a lens, and a filter. The first fiber has an end and is for carrying a first optical signal. The second fiber is for carrying a second optical signal. The lens is disposed between the filter and the end of the first fiber. The lens also has an axis and is for collimating the first optical signal. The filter has a surface and is for filtering the first optical signal to provide the second optical signal. A normal to the surface of the filter is disposed at a first nonzero angle to the axis. The first optical signal has a first direction of propagation at the surface of the filter. The first direction of propagation is disposed at a second nonzero angle from the normal to the surface of the filter. The filter can be tuned by rotating the filter around the axis. Furthermore, additional fibers can be added to simultaneously filter multiple channels.

According to the system and method disclosed herein, the present invention provides an optical filter which is tunable, relatively easy to manufacture, and low in cost. Furthermore, a single filter having relaxed accuracy requirements could be used for filtering multiple channels.

BRIEF DESCRIPTION OF THE DRAWINGS

FIG. 2 is a simplified diagram of a two-channel optical filter in accordance with the present invention.

FIG. 3A is a diagram of a portion of the two-channel optical filter in accordance with the present invention showing the angle between the axis of the lens and the normal to the surface of the filter.

FIG. 3B is a diagram of a portion of the two-channel optical filter in accordance with the present invention showing the angle between the direction of propagation of a signal and the normal to the surface of the filter.

DETAILED DESCRIPTION OF THE INVENTION

The present invention relates to an improvement in optical filters. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Figure 1:
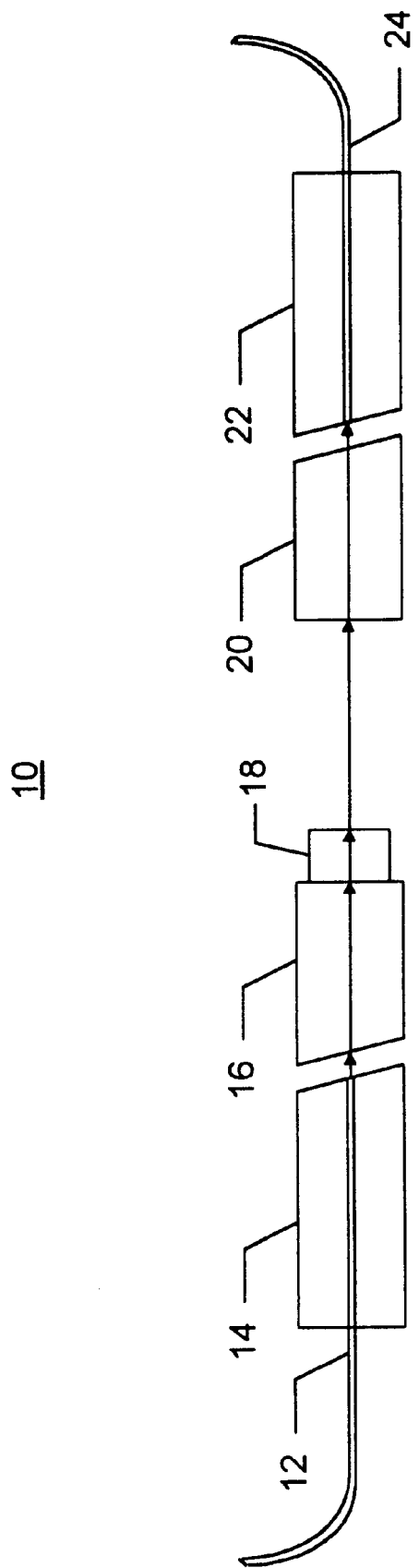
FIG. 1 is a diagram conventional optical filter.

FIG. 1 is a block diagram of a conventional optical filter 10. Such a conventional optical filter 10 might be used for reducing cross talk when demultiplexing composite optical signals including a plurality of channels. The conventional optical filter 10 is used to filter a signal carried on optical fiber 12. The signal is input from fiber 12 which is held in place by a capillary 14. The signal is transmitted to a graduated index of refraction ("GRIN") lens 16 which collimates the signal. After collimation, the optical signal is transmitted to a filter 18. The filter 18 transmits light in a pass band having a range of wavelengths a centered around a central wavelength. The transmitted light passes through a second GRIN lens 20 to a second fiber 24 held in place by a second capillary 22. Consequently, a filtered signal can be provided on the fiber 24. Thus, the conventional optical filter 10 can be used in applications which remove a portion of an optical signal, for example in a wavelength division multiplexer ("WDM"), not shown, which uses filters to isolate individual channels of a composite signal.

Although the conventional optical filter 10 is capable of filtering optical signals, one of ordinary skill in the art will recognize that the filter 18 is typically affixed to the GRIN lens 16 such that the angle of incidence of the optical signal is fixed. FIG. 1B depicts a portion of the conventional optical filter 10 including the GRIN lens 16 and the filter 18. Also depicted are the axis of the GRIN lens 17 and a normal 19 to the surface of the filter 18 that is closest to the GRIN lens 18. The axis 17 of the GRIN lens 16 is typically down its center, along the direction of propagation of the optical signal. The normal 19 to the surface of the filter 18 is typically substantially parallel to the axis of the GRIN lens 16. The angle of incidence for the optical signal and the filter is the angle between a direction of propagation of the optical signal at the filter 18 and a normal to the surface of the filter 18. Because of the relationship between the axis of the GRIN lens 16 and the normal 19 to the surface of the filter 18, the angle of incidence of the optical signal is fixed. This is true even if, in contrast to the optical signal shown in FIG. 1, the optical signal does not travel parallel to the axis of the GRIN lens 16.

The central wavelength of the pass band for the filter 18 depends on the angle of incidence. Because the angle of incidence is fixed for the filter 18 in the conventional optical filter 10, the central wavelength of the pass band for the filter 18 does not change. Consequently, the filter 18 must be manufactured to transmit only the appropriate range of wavelengths. For example, when producing filters such as the filter 18, an entire wafer is manufactured and multiple filters cut from the wafer. Each of the filters is guaranteed to be within a particular error of the desired central wavelength. Because the angle of incidence is fixed and the channel spacing of the optical signal may be small, only those filters having a smaller error can be used in the conventional optical filter 10. These more stringent specifications increase the difficulty in and cost of producing a filter 18 and, therefore, any system which utilizes the filter 18.

In addition, the conventional optical filter 1O is extremely expensive when used for filtering channels of conventional composite optical signals: Such conventional composite optical signals may have forty or more channels. Several optical filters 10 are typically used for each channel of the composite optical signal. To filter the channels of such a composite signal, the filter 52 in each conventional optical filter 10 transmits a channel. Each filter 52 has different specifications in order to transmit a different set of wavelengths and, therefore, transmit a particular channel. Consequently, not only are the specifications for each filter 52 stringent, but there are different specifications for each filter 52 in each conventional optical filter 10 used to transmit a different channel. Producing filters with different specifications is more expensive than producing filters having the same specification because the filters are produced in different lots. Thus, making each filter 52 with different specifications and with each set of specifications being closely controlled is extremely expensive. Moreover, a system which includes a conventional optical filter 10 for each channel is very large. Accordingly, what is needed is a method and system for reducing the size and cost of filtering optical signals.

The present invention provides a method and system for providing an optical filter. The method and system comprise providing a first fiber, a second fiber, a lens, and a filter. The first fiber has an end and is for carrying a first optical signal. The second fiber is for carrying a second optical signal. The lens is disposed between the filter and the end of the first fiber. The lens also has an axis and is for collimating the first optical signal. The filter has a surface and is for filtering the first optical signal to provide the second optical signal. A normal to the surface of the filter is disposed at a first nonzero angle to the axis. The first optical signal has a first direction of propagation at the surface of the filter. The first direction of propagation is disposed at a second nonzero angle from the normal to the surface of the filter. The filter can be tuned by rotating the filter around the axis. Furthermore, additional fibers can be added to simultaneously filter multiple channels.

The present invention will be described in terms of a particular optical filter having certain components. However, one of ordinary skill in the art will readily recognize that this method and system will operate effectively for other optical filters having other components.

To more particularly illustrate the method and system in accordance with the present invention, refer now to FIG. 2 depicting a simplified diagram of one embodiment of an optical filter 100 in accordance with the present invention. The optical filter 100 shown is a two-channel optical filter. However, a filter having another number of channels, such as a one-channel filter, could also be manufactured. The optical filter 100 includes a first fiber 102, a second fiber 120, a third fiber 104, and a fourth fiber 118. The optical filter 100 also includes a first holder 106, a firsts lens 108, a filter 110, a second lens 114, and a second holder 116. The filter 100 also includes a jig 112 for holding the filter 110. The filter 110 is preferably held within the jig 112. The jig 112 is attached to the first lens 108. Although the jig 112 is depicted, nothing prevents the use of another mechanism for holding the filter 110. The mechanism which holds the filter 110 to the lens 108 should, however, be capable of being rotated to tune the filter, as discussed below. For example, the jig 112 can be rotated to tune the filter 110 prior to the jig 112 being fixed with respect to the first lens 108. The first lens 108 and first holder 106 are held within a first tube 122, preferably using epoxy. In a preferred embodiment, the first tube 122 is glass, but could also include ceramic, stainless steel, or another material. Similarly, the second lens 114 and second holder 116 are held within a second tube 124, preferably using epoxy. The second tube 124 is preferably glass, but could also include ceramic, stainless steel, or another material. The optical filter 100 could also include other components, not shown.

FIG. 3A depicts a portion of the optical filter 100. In particular, the relationship between the filter 110 and the GRIN lens 108 is depicted. The GRIN lens 108 has an axis 107. A surface of the filter 110 is characterized by a normal 109 to the surface. During fabrication of the optical filter 100, the filter 110 is oriented such that the axis 107 of the GRIN lens 108 makes a nonzero angle, $\Theta_1$, with the normal 109 to the surface of the filter 110. Referring to FIGS. 2 and 3A, in a preferred embodiment, this is accomplished by mounting the filter 110 in the jig 112 at the some angle from vertical and attaching the jig 112 to the lens 108.

Referring back to FIG. 2, also depicted are the first and second optical signals received by and output from the optical filter 100. The first fiber 102 receives a first optical signal and provides the first optical signal to the first lens 108, which collimates the first optical signal. The first optical signal is then provided to the filter 110. The filtered first optical signal is provided from the filter 110 to the second lens 114 and output by the second fiber 120. Similarly, the second optical signal is received by the third fiber 104. The second optical signal is provided to the first lens 108 and the filter 110. The filtered second optical signal is provided to the second lens 114 and output by the fourth fiber 118.

FIG. 3B depicts a portion of the optical filter 100. In particular, the GRIN lens 108 and the filter 110 are shown. In addition, the first optical signal and the normal 109 to the surface of the filter 110 are shown. Near the surface of the filter 110, the first optical signal has a direction of propagation indicated by the arrow. The angle of incidence for the first optical signal at the filter 110, $\Theta_2$, is nonzero. Furthermore, $\Theta_2$ is not the same as $\Theta_1$. In other words, the direction of propagation of the first optical signal near the surface of the filter 110 is not parallel to the axis 107 of the lens 108. However, as shown in FIG. 3B, the direction of propagation of the first signal may be close to parallel to the axis 107. Similarly, the angle of incidence for the second optical signal at the filter 110 is nonzero and different from $\Theta_1$. Although not parallel to the axis 107, the direction of propagation of the second optical signal may be only slightly canted from being parallel to the axis 107. In addition, in some embodiments, the angle of incidence for the first optical signal at the filter 110 and the angle of incidence for the second optical signal at the filter 110 are the same.

Because the normal 109 to the surface of the filter 110 and the directions of propagation of the first and second optical signals are not parallel to the axis 107 of the lens 108, the wavelength of the light which the optical filter 100 transmits can be tuned. The optical filter 100 can be coarse-tuned by the setting the angle $\Theta_1$, between the axis 107 and the normal 109 to the surface. This can be accomplished using the angle at which the filter 110 is canted from vertical in the jig 112. Setting the angle $\Theta_1$, in this manner sets the angle of incidence to be within a particular range. The optical filter 100 can then be fine-tuned by rotating the filter 110 around the axis 107. This is preferably done by rotating the jig 112 with respect to lens 108. Because the normal 109 to the surface of the filter 110 and the directions of propagation of the first and second optical signals are not parallel to the axis of the lens 108, rotating the filter 110 around the axis 107 slightly changes the angle of incidence $\Theta_2$. As discussed previously, the central wavelength of light transmitted by the filter 110 depends upon the angle of incidence. Thus, the central wavelength of light transmitted by the filter 110 can be coarse and fine-tuned.

Figure 4:
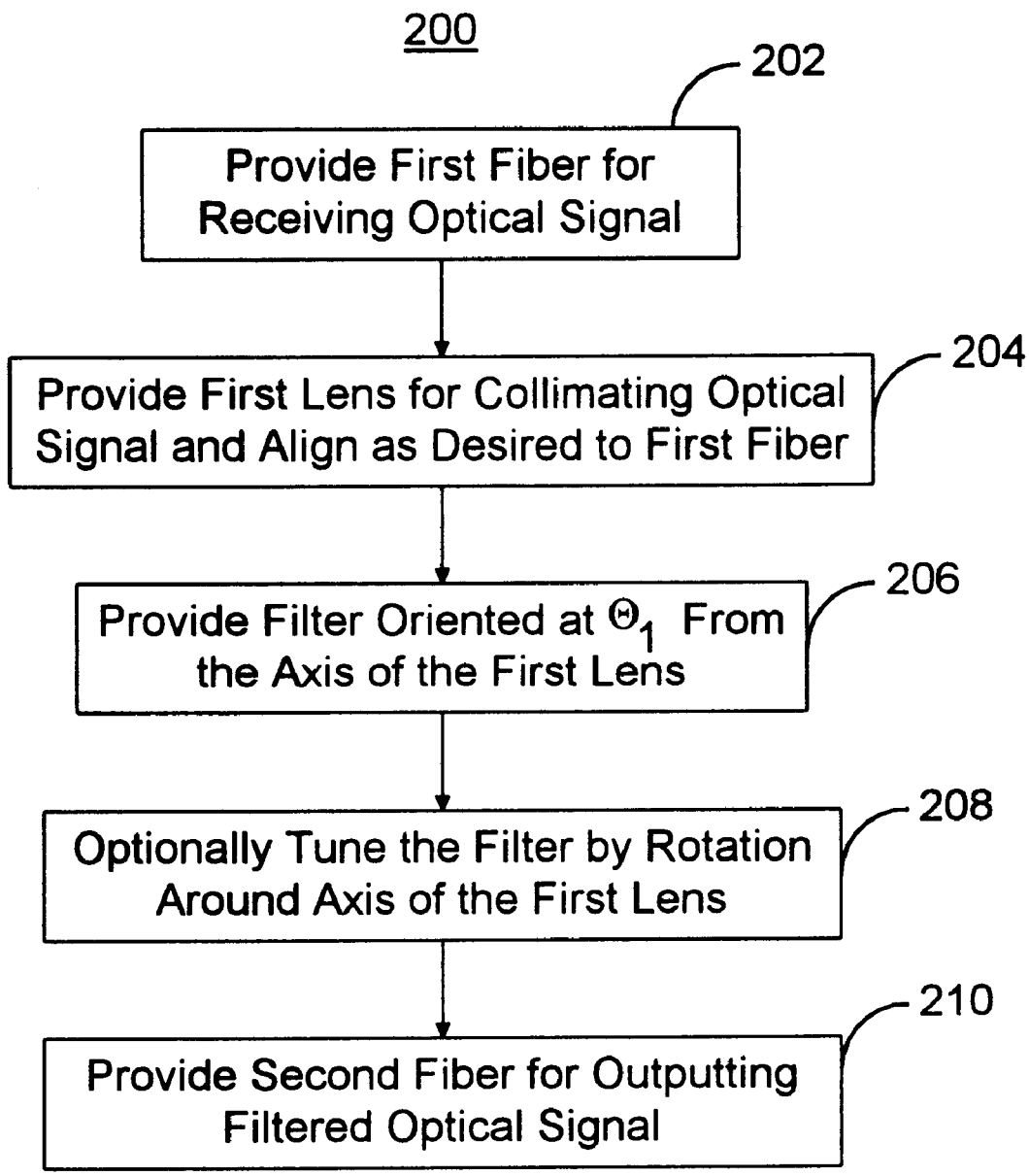
FIG. 4 depicts a method for providing the optical filter in accordance with the present invention.

FIG. 4 depicts a method for providing an optical filter in accordance with the present invention, such as the optical filter 100. The first fiber 102 for receiving the first optical signal is provided, via step 202. The first lens 108 is provided and aligned as desired with respect to the first fiber 102, via step 204. The filter 110 is provided such that the normal 109 to the surface of the filter 110 is at an angle of $\Theta_1$ from the axis of the first lens, via step 206. Step 206 allows the optical filter 100 to be coarse tuned. The filter 110 and, therefore, the optical filter 100, can be fine-tuned by a rotation around the axis 107 of the lens 108, via step 208. In a preferred embodiment, step 208 includes rotating the jig 112 around the axis 107 of the lens 108. The second fiber 120 for outputting the filtered optical signal is then provided, via step 210.

Thus, the optical filter 100 can be coarse and fine-tuned as it is built. Because the angle of incidence can be coarse and fine-tuned, many benefits are achieved. First, the optical filter 100 can be accurately tuned to the desired wavelength. Furthermore, a single filter, such as the filter 110, could be used to filter multiple channels. This is because the angle of incidence for different optical signals may differ. In addition, the requirements for the filter 108 are eased. Because the filter 108 can be tuned to the desired central wavelength, a filter having less strict tolerances can be used. In other words, a filter with a larger error in the central wavelength may be used because the filter can be tuned. Filters which have larger errors are also less expensive, reducing the cost of the optical filter 100. In addition, the optical filter 100 may use a single filter 108 for multiple channels, such as the first and second optical signals discussed with respect to FIG. 2. Because only one filter is used for multiple channels, rather than one filter per channel, the cost of the optical filter 100 is further reduced. Because filters having larger errors can be used, the yield of usable filters in manufacturing the filters is increased. Furthermore, the ability to use filters having a larger error increases the availability of usable filters because both filters having strict tolerances and filters having lower tolerances can be used. Thus, the optical filter 100 is accurately tunable to the desired wavelength as well as cost effective.

Furthermore, the optical filter 100 may be relatively simple to manufacture. As discussed above, setting the angle of the filter 108 in the jig 112 can perform coarse tuning of the optical filter 100. Different jigs can be made for different angles, allowing the manufacturer to roughly tune the optical filter 100 by selecting a particular jig. Thus, coarse tuning is a relatively simple process. Fine-tuning can be performed by rotating the jig 112 with respect to the lens 108. This is also a relatively simple process. Therefore, the coarse and fine-tuning of the optical filter are relatively easy to perform, thereby simplifying manufacturing.

A method and system has been disclosed for an optical filter which is particularly useful in multi-channel optical filters. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An optical filter comprising:
    a first fiber for carrying a first optical signal, the first fiber having an end;
    a second fiber for carrying a second optical signal;
    a filter for filtering the first optical signal to provide the second optical signal, the filter having a surface;
    a lens for collimating the first optical signal, the lens having an axis and being disposed between the end of the first fiber and the filter, a normal to the surface of the filter being disposed at a first nonzero angle to the axis;

wherein the first optical signal has a first direction of propagation at the surface of the filter, the first direction of propagation being disposed at a second nonzero angle from the normal to the surface of the filter; and wherein the filter is tuned by rotating the filter around the axis.

2. The optical filter of claim 1 further comprising:

a third fiber for carrying a third optical signal, the third optical signal having a second direction of propagation at the surface of the filter, the second direction of propagation being disposed at a third nonzero angle from the normal to the surface, and a fourth fiber for carrying a fourth optical signal;

wherein the filter also filters the third optical signal to provide the fourth optical signal.

3. The optical filter of claim 2 wherein the second nonzero angle and the third nonzero angle are different.

4. The optical filter of claim 2 further comprising:

a first holder for receiving the first fiber and the third fiber therein; and a second holder for receiving the second fiber and the fourth fiber therein.

5. The optical filter of claim 4 further comprising:

a first tube for holding the first holder and the lens therein; and a second tube for holding the second holder therein.

6. The optical filter of claim 1 wherein the second fiber further includes an end and wherein the optical filter further comprises:

a second lens disposed between the end of the second fiber and the filter, the second lens for collimating the second optical signal.

7. The optical filter of claim 1 further comprising:

a jig for holding the filter such that the normal to the surface is disposed at the first nonzero angle to the axis, the filter being tuned by rotating the jig around the axis.

8. The optical filter of claim 1 further comprising:

a holder for receiving the first fiber therein.

9. The optical filter of claim 8 further comprising:

a tube for holding the holder and the lens therein.

10. The optical filter of claim 1 wherein the optical filter further includes an optic axis and wherein the axis of the lens is substantially parallel to the optic axis.

11. The optical filter of claim 1 wherein the first optical signal has a first direction of propagation, wherein the second optical signal has a second direction of propagation and wherein the axis of the lens is substantially parallel to the first direction of propagation and the second direction of propagation.

12. A method for providing an optical filter comprising the steps of:

providing a first fiber for carrying a first optical signal, the first fiber having an end;

providing a second fiber for carrying a second optical signal;

providing a lens having an axis, the lens for collimating the first optical signal;

providing a filter having a surface such that a normal to the surface of the filter is disposed at a first nonzero angle to the axis and such that the first optical signal has a first direction of propagation at the surface of the filter, the first direction of propagation being disposed at a second nonzero angle from the normal to the surface of the filter, the filter for filtering the first optical signal to provide the second optical signal; and tuning the filter by rotating the filter around the axis.

13. The method of claim 12 further comprising the steps of:

providing a third fiber for carrying a third optical signal, the third optical signal having a second direction of propagation at the surface of the filter, the second direction of propagation being disposed at a third nonzero angle from the normal to the surface; and providing a fourth fiber for carrying a fourth optical signal;

wherein the filter also filters the third optical signal to provide the fourth optical signal.

14. The method of claim 13 wherein the second nonzero angle and the third nonzero angle are different.

15. The method of claim 13 further comprising the steps of:

providing a first holder for receiving the first fiber and the third fiber therein; and providing a second holder for receiving the second fiber and the fourth fiber therein.

16. The method of claim 15 further comprising the steps of:

providing a first tube for holding the first holder and the lens therein; and providing a second tube for holding the second holder therein.

17. The method of claim 12 wherein the second fiber further includes an end and wherein the method comprises the step of:

providing a second lens disposed between the end of the second fiber and the filter, the second lens for collimating the second optical signal.

18. The method of claim 12 further comprising the steps of:

providing a jig for holding the filter such that the normal to the surface is disposed at the first nonzero angle to the axis, the filter being tuned by rotating the jig around the axis.

19. The method of claim 12 further comprising the step of:

providing a holder for receiving the first fiber therein.

20. The method of claim 12 further comprising the steps of providing a tube for holding the holder and the lens therein.

21. The method of claim 12 wherein the optical filter further includes an optic axis and wherein the axis of the lens is substantially parallel to the optic axis.

22. The method of claim 12 wherein the first optical signal has a first direction of propagation, wherein the second optical signal has a second direction of propagation and wherein the axis of the lens is substantially parallel to the first direction of propagation and the second direction of propagation.

23. A method for filtering an optical signal comprising the steps of:

providing the optical signal having a first direction of propagation to a lens having an axis, the lens for collimating the optical signal;

providing the optical signal from the lens to a filter having a surface at a first direction of propagation, a normal to the surface being disposed at a first nonzero angle to the axis of the lens, the first direction of propagation at the surface of the filter being disposed at a second nonzero angle to the normal to the surface of the filter, the filter being tuned by rotating the filter around the axis of the lens;

filtering the optical signal.

24. The method of claim 23 wherein the optical filter further includes an optic axis and wherein the axis of the lens is substantially parallel to the optic axis.

25. The method of claim 23 wherein the first optical signal has a first direction of propagation, wherein the second optical signal has a second direction of propagation and wherein the axis of the lens is substantially parallel to the first direction of propagation and the second direction of propagation.

* * * * *